United States Patent
Bigioi et al.

(10) Patent No.: US 7,792,970 B2
(45) Date of Patent: Sep. 7, 2010

(54) METHOD FOR ESTABLISHING A PAIRED CONNECTION BETWEEN MEDIA DEVICES

(75) Inventors: Petronel Bigioi, Galway (IE); Peter Corcoran, Claregalway (IE); Eran Steinberg, San Francisco, CA (US)

(73) Assignee: FotoNation Vision Limited, Galway (IE)

( * ) Notice: Subject to any disclaimer, the term of this patent is extended or adjusted under 35 U.S.C. 154(b) by 1313 days.

(21) Appl. No.: 11/294,628

(22) Filed: Dec. 2, 2005

(65) Prior Publication Data

US 2006/0284982 A1    Dec. 21, 2006

Related U.S. Application Data

(63) Continuation-in-part of application No. 11/156,234, filed on Jun. 17, 2005, now Pat. No. 7,506,057.

(51) Int. Cl.
    G06F 15/16 (2006.01)
(52) U.S. Cl. .................. 709/227; 709/202; 709/203; 709/228; 709/250
(58) Field of Classification Search ......... 709/201–204, 709/217–219, 227–229, 250
See application file for complete search history.

(56) References Cited

U.S. PATENT DOCUMENTS

| | | | |
|---|---|---|---|
| 5,500,700 A | 3/1996 | Massarsky | |
| 5,555,376 A | 9/1996 | Theimer et al. | |
| 5,602,997 A | 2/1997 | Carpenter et al. | |
| 5,727,135 A | 3/1998 | Webb et al. | |
| 5,774,172 A | 6/1998 | Kapell et al. | |
| 5,812,865 A | 9/1998 | Theimer et al. | |
| 5,886,732 A | 3/1999 | Humpleman | |
| 5,905,521 A | 5/1999 | Gatto et al. | |
| 6,182,094 B1 | 1/2001 | Humpleman et al. | |
| 6,184,998 B1 | 2/2001 | Tebeka | |
| 6,211,870 B1 | 4/2001 | Foster | |
| 6,275,144 B1 | 8/2001 | Rumbaugh | |
| 6,496,122 B2 | 12/2002 | Sampsell | |
| 6,591,069 B2 | 7/2003 | Horiguchi | |

(Continued)

FOREIGN PATENT DOCUMENTS

EP    1039772 A1    9/2000

(Continued)

OTHER PUBLICATIONS

PCT Invitation to Pay Additional Fees for PCT Application No. PCT/EP2006/003999, dated Oct. 10, 2006, 5 pages.

(Continued)

*Primary Examiner*—Bharat N Barot
(74) *Attorney, Agent, or Firm*—Andrew V. Smith

(57) ABSTRACT

A method for establishing a paired connection between first and second media devices across a network includes transmitting a first information message across the network including an identifier that includes a request to pair the first and second media devices. When a second information message is received from the second media device within a first predetermined time period, the first device retrieves an identifier of the second device and transmits a confirmation message across the network including the device identifiers. A paired connection between the media devices is completed after a corresponding confirmation message from the second device is received within a second predetermined time period.

57 Claims, 9 Drawing Sheets

U.S. PATENT DOCUMENTS

| | | | |
|---|---|---|---|
| 6,633,281 | B2 | 10/2003 | Lin et al. |
| 6,690,357 | B1 | 2/2004 | Dunton et al. |
| 6,697,090 | B1 | 2/2004 | Nagasaka et al. |
| 6,725,281 | B1 | 4/2004 | Zintel et al. |
| 6,750,902 | B1 | 6/2004 | Steinberg et al. |
| 6,779,004 | B1 | 8/2004 | Zintel |
| 6,798,459 | B1 | 9/2004 | Izumi |
| 6,810,409 | B1 | 10/2004 | Fry et al. |
| 6,822,698 | B2 | 11/2004 | Clapper |
| 6,894,686 | B2 | 5/2005 | Stamper et al. |
| 7,023,498 | B2 | 4/2006 | Ishihara |
| 7,039,727 | B2 | 5/2006 | Camara et al. |
| 7,092,022 | B1 | 8/2006 | Brake |
| 7,115,032 | B2 | 10/2006 | Cantu et al. |
| 7,128,420 | B2 | 10/2006 | Kapellner et al. |
| 7,199,909 | B2 | 4/2007 | Han et al. |
| 7,202,893 | B2 | 4/2007 | Schick et al. |
| 7,315,631 | B1 | 1/2008 | Corcoran et al. |
| 7,340,214 | B1 | 3/2008 | Hamberg |
| 7,380,260 | B1 | 5/2008 | Billmaier et al. |
| 7,432,990 | B2 | 10/2008 | Borden, IV et al. |
| 7,457,966 | B2 | 11/2008 | Shinada |
| 7,469,071 | B2 | 12/2008 | Drimbarean et al. |
| 7,496,278 | B2 | 2/2009 | Miyamoto et al. |
| 7,506,057 | B2 * | 3/2009 | Bigioi et al. .......... 709/227 |
| 7,519,686 | B2 | 4/2009 | Hong et al. |
| 7,564,994 | B1 | 7/2009 | Steinberg et al. |
| 7,581,182 | B1 | 8/2009 | Herz |
| 2002/0038372 | A1 | 3/2002 | Idehara et al. |
| 2002/0043557 | A1 | 4/2002 | Mizoguchi et al. |
| 2002/0084909 | A1 | 7/2002 | Stefanik et al. |
| 2002/0120944 | A1 | 8/2002 | Wasilewski |
| 2003/0160890 | A1 | 8/2003 | Caspe et al. |
| 2003/0163542 | A1 | 8/2003 | Bulthuis et al. |
| 2004/0090461 | A1 | 5/2004 | Adams |
| 2004/0100486 | A1 | 5/2004 | Flamini et al. |
| 2004/0146057 | A1 | 7/2004 | Yi et al. |
| 2004/0155791 | A1 | 8/2004 | Nguyen et al. |
| 2004/0175040 | A1 | 9/2004 | Rizzotti et al. |
| 2004/0205220 | A1 | 10/2004 | Nakamura et al. |
| 2004/0221044 | A1 | 11/2004 | Rosenbloom et al. |
| 2004/0223060 | A1 | 11/2004 | Yasuda |
| 2004/0223747 | A1 | 11/2004 | Otala et al. |
| 2004/0224638 | A1 | 11/2004 | Fadell et al. |
| 2005/0041121 | A1 | 2/2005 | Steinberg et al. |
| 2005/0055716 | A1 | 3/2005 | Louie et al. |
| 2005/0068447 | A1 | 3/2005 | Steinberg et al. |
| 2005/0068452 | A1 | 3/2005 | Steinberg et al. |
| 2005/0140801 | A1 | 6/2005 | Prilutsky et al. |
| 2005/0219241 | A1 | 10/2005 | Chun |
| 2005/0251754 | A1 | 11/2005 | Padgett et al. |
| 2006/0007306 | A1 | 1/2006 | Masters et al. |
| 2006/0018025 | A1 | 1/2006 | Sharon et al. |
| 2006/0022895 | A1 | 2/2006 | Williams et al. |
| 2006/0025092 | A1 | 2/2006 | Sanders et al. |
| 2006/0048194 | A1 | 3/2006 | Poslinski |
| 2006/0098890 | A1 | 5/2006 | Steinberg et al. |
| 2006/0120599 | A1 | 6/2006 | Steinberg et al. |
| 2006/0140455 | A1 | 6/2006 | Costache et al. |
| 2006/0149811 | A1 | 7/2006 | Bennett et al. |
| 2006/0204055 | A1 | 9/2006 | Steinberg et al. |
| 2006/0204110 | A1 | 9/2006 | Steinberg et al. |
| 2006/0279662 | A1 | 12/2006 | Kapellner et al. |
| 2006/0282551 | A1 | 12/2006 | Steinberg et al. |
| 2006/0282572 | A1 | 12/2006 | Steinberg et al. |
| 2006/0284982 | A1 | 12/2006 | Bigioi et al. |
| 2006/0285502 | A1 | 12/2006 | Bigioi et al. |
| 2006/0285754 | A1 | 12/2006 | Steinberg et al. |
| 2006/0288071 | A1 | 12/2006 | Bigioi et al. |
| 2007/0047043 | A1 | 3/2007 | Kapellner et al. |
| 2007/0094703 | A1 | 4/2007 | Nygaard et al. |
| 2007/0110305 | A1 | 5/2007 | Corcoran et al. |
| 2007/0116380 | A1 | 5/2007 | Ciuc et al. |
| 2007/0147820 | A1 | 6/2007 | Steinberg et al. |
| 2007/0201725 | A1 | 8/2007 | Steinberg et al. |
| 2007/0263104 | A1 | 11/2007 | DeLuca et al. |
| 2007/0269108 | A1 | 11/2007 | Steinberg et al. |
| 2007/0296833 | A1 | 12/2007 | Corcoran et al. |
| 2008/0013799 | A1 | 1/2008 | Steinberg et al. |
| 2008/0240555 | A1 | 10/2008 | Nanu et al. |
| 2008/0250239 | A1 | 10/2008 | Risan et al. |
| 2008/0292193 | A1 | 11/2008 | Bigioi et al. |
| 2009/0115915 | A1 | 5/2009 | Steinberg et al. |

FOREIGN PATENT DOCUMENTS

| | | |
|---|---|---|
| JP | 10174009 A2 | 6/1998 |
| JP | 2009500880 T | 1/2009 |
| WO | 0135664 A2 | 5/2001 |
| WO | WO-2006119877 A1 | 11/2006 |
| WO | WO 2006/133764 A2 | 12/2006 |
| WO | 2006133764 A3 | 4/2007 |
| WO | WO-2008021945 A2 | 2/2008 |
| WO | 2006133764 A3 | 4/2008 |

OTHER PUBLICATIONS

Notification of Transmittal of the International Search Report and the Written Opinion of the International Searching Authority, or the Declaration for PCT Application No. PCT/EP2006/003999, dated Jan. 30, 2007, 19 pages.

Bigioi P. et al., "PTP/IP—a new transport specification for wireless photography" IEEE Transactions on Consumer Electronics, vol. 51, Feb. 2005, XP002390454.

FotoNation, Inc. Report: "PTP over IP the state of the development" Internet, Sep. 2004, XP002390455, Retrieved from the Internet: URL:http://www.i3a.org/pdf/PTPIP_Technical_overview_Oct2004.pdf.>.

Nikon Report: "Das Nikon Neuigkeiten-Archiv" News-Archiv, Feb. 2005 XP002390456 Internet.

Corcoran, P.M., et al., "Internet enabled digital photography" IEEE Transactions on Consumer Electronics, vol. 45, Aug. 3, 1999, pp. 577-583, XP002415217.

Corcoran, P.M., et al., "Wireless transfer of images from a digital camera to the Internet via a standard GSM mobile phone" IEEE Transactions on Consumer Electronics, vol. 47, Aug. 3, 2001, pp. 542-547, XP002415218.

White Paper of CIPA DC-005-2005, "'Picture Transfer Protocol' over TCP/IP networks", Standard of the Camera & Imaging Products Association, published by Camera & Imaging Products Association, Nov. 8, 2005, 6 pages.

Examination Report for European Patent Application No. 06742746.8, dated Mar. 6, 2008, 5 Pages.

International Preliminary Report on Patentability for PCT Application No. PCT/EP2006/003999, dated Dec. 17, 2007, 13 pages.

Bigioi, P. et al., "Digital camera connectivity solutions using the picture transfer protocol (PTP)", IEEE Transactions on Consumer Electronics, 2002, pp. 417-427, vol. 48—Issue 3.

Canon, "PowerShot G1, Camera User Guide" and "Software Starter Guide", 2000.

CIPA DC-001-2003: "Digital Photo Solutions for Imaging Devices," Published by Camera and Imaging Products Association, PictBridge Standard of Camera and Imaging Products Association, Feb. 3, 2003, http://www.cipajp/pictbridge/contents_e/03overview e.html.

CIPA DC-005-2005: "'Picture Transfer Protocol' over TCP/IP Networks," Published by Camera and Imaging Products Association, CIPA Standard of the Camera and Imaging Products Association, Nov. 8, 2005, http://www.cipa.jp/ptp-ip/documents_e/CIPA_DC-005_Whitepap, 6 pages.

CIPA, Digital Photo Solutions for Imaging Devices, 2003, CIPA, pp. 1-6.

Dell, "Owner's Manual—Dell Inspiron 1100", 2003.

Digital-Album by Nixvue Systems Ltd. (www.nixvue.com).

Hewlett Packard, hp psc 2500 photosmart series all-in-one, 2003, Hewlett Packard, pp. 6-8, 29, 141 and 142.

Interact-TV, "Telly: The Home Entertainment Server", Jun. 22, 2004, "http://web.archive.org/web/20040622083339/interacttv.com/products.php".

ISO 15740 Enables Seamless Image Transfer Between Devices, Sep. 26, 2005, 3 pages, http://www.i3a.org/pr_09_26_05.html.

Microsoft, Computer Dictionary, 1997, Microsoft Press, Third Edition, p. 225.

Patent Abstract of Japan, vol. 1, 1998, No. 11, Sep. 30, 1998 and JP 10-174009 A, Jun. 26, 1998.

PCT International Search Report and the Written Opinion of the International Searching Authority for PCT Application No. PCT/EP2006/004006, dated Jun. 26, 2006, 8 pages.

PCT Notification of Transmittal of the International Search Report and the Written Opinion of the International Searching Authority, or the Declaration for PCT application No. PCT/US2007/075564, dated Jan. 30, 2008, 11 pages.

PIMA 15740:2000: Photography—Electronic Still Picture Imaging—Picture Transfer Protocol (PTP) for Digital Still Photography Devices, Photographic and Imaging Manufacturings Association, Approved Jul. 5, 2000, First Edition.

PTP: enabling seamless image transfer between devices. Overview of ISO 15740: 2005—Picture Transfer Protocol (PTP), http://www.i3a.org/pdf/i3a_ptp_factsheet.pdf.

Research-lab, "Better Wave to Text", Dec. 30, 2004, "http://www.research-lab.com/vexp007read.htm".

The PrismIQ Media Adapter (www.prismiq.com).

Toshiba, libretto U100, Apr. 22, 2005, Toshiba America Information Systems Inc., Rev. 1.02.

UPNP Forum http://www.upnp.org.

Nikon Wireless Transmitter "WT-2", Users's Manual—55 pages.

Non-Final Office Action mailed May 20, 2009, for U.S. Appl. No. 11/123,961, filed May 6, 2005.

Non-Final Office Action mailed Jul. 9, 2008, for U.S. Appl. No. 11/123,961, filed May 6, 2005.

Non-Final Office Action mailed Aug. 21, 2007, for U.S. Appl. No. 11/123,961, filed May 6, 2005.

Final Office Action mailed Feb. 8, 2008, for U.S. Appl. No. 11/123,961, filed May 6, 2005.

Non-Final Office Action mailed Apr. 29, 2009, for U.S. Appl. No. 11/156,235, filed Jun. 17, 2005.

Non-Final Office Action mailed Jul. 23, 2008, for U.S. Appl. No. 11/156,235, filed Jun. 17, 2005.

Non-Final Office Action mailed Oct. 3, 2007, for U.S. Appl. No. 11/156,235, filed Jun. 17, 2005.

Final Office Action mailed Feb. 20, 2008, for U.S. Appl. No. 11/156,235, filed Jun. 17, 2005.

Final Office Action mailed Jan. 7, 2009, for U.S. Appl. No. 11/156,235, filed June 17, 2005.

Final Office Action mailed Jan. 28, 2008, for U.S. Appl. No. 11/123,972, filed May 6, 2005.

Non-Final Office Action mailed May 28, 2009, for U.S. Appl. No. 11/123,972, filed May 6, 2005.

Non-Final Office Action mailed Jul. 9, 2008, for U.S. Appl. No. 11/123,972, filed May 6, 2005.

Non-Final Office Action mailed Sep. 12, 2007, for U.S. Appl. No. 11/123,972, filed May 6, 2005.

Final Office Action mailed Nov. 12, 2008, for U.S. Appl. No. 11/123,972, filed May 6, 2005.

USB Device Working Group, "USB Still Image Capture Device Definition", Revision 1.0, Jul. 11, 2000, http://www.usb.org/developers/devclass_docs/usb_still_img10.pdf.

Notice of Allowance mailed Dec. 24, 2009, for U.S. Appl. No. 11/123,972, filed May 6, 2005.

Notice of Allowance mailed Jan. 4, 2010, for U.S. Appl. No. 11/123,961, filed May 6, 2005.

* cited by examiner

Figure 4

| Field | Size [Bytes] | Data Type |
|---|---|---|
| Protocol GUID | 16 | UINT8 |
| Packet Type | 2 | UINT16 |
| Payload | ? | ? |

Figure 5

| Field | Size [Bytes] | Data Type |
|---|---|---|
| Protocol GUID | 16 | UINT8 |
| Packet Type | 2 | UINT16 |
| Device GUID | 16 | UINT8 |
| Device Friendly Name | 2..80 | UINT16 |
| Reserved Data | 0 or more | UINT8 |

Figure 6

| Field | Size [Bytes] | Data Type |
|---|---|---|
| Protocol GUID | 16 | UINT8 |
| Packet Type | 2 | UINT16 |
| Own Device GUID | 16 | UINT8 |
| Received Device GUID | 16 | UINT8 |

METHOD FOR ESTABLISHING A PAIRED CONNECTION BETWEEN MEDIA DEVICES

RELATED APPLICATIONS

This application is a Continuation in Part (CIP) of U.S. patent application Ser. No. 11/156,234, filed Jun. 17, 2005, now U.S. Pat. No. 7,506,057, which is related to a contemporaneously filed application having Ser. No. 11/156,235, and each is hereby incorporated by reference.

FIELD OF THE INVENTION

The invention relates to the field of networked appliances, particularly to networked digital cameras and support appliances for analysis, management, post-processing, sorting, storage and printing of digital images, metadata and audio data associated with said images.

BACKGROUND

Recently, communication protocols have developed for allowing a computing device to control and communicate with media devices such as digital cameras. One such protocol, ISO 157540 Picture Transfer Protocol (PTP), incorporated into products of the Microsoft Corporation of Redmond, Wash., can be used in connection with transferring images from imaging devices, such as cameras, to personal computing devices. This protocol defines how the digital still camera can communicate with a personal computing device.

Referring to FIG. 1, the PTP protocol is an asymmetric control and data transfer protocol, somewhat like a master/slave protocol. However, in PTP parlance one refers to the devices engaged in a picture transfer as the Initiator 310 and Responder 230, rather than the Master and Slave. The Initiator 310 device establishes and subsequently manages a control connection while the Responder is defined as the device that responds to operation requests such as an "OpenSession" request.

Devices, in the PTP protocol model, can be Initiators, Responders, or both. For instance, a PC may be configured only as an Initiator device while a USB camera may be only a Responder. Similarly, a wireless camera, that opens a connection to a wireless PTP printer and pushes pictures for print, may be only an Initiator while the corresponding printer may be only a Responder. It is recognized by the inventors of the present invention that a digital camera that can connect to other digital cameras and is able to both initiate and receive a PTP session will have to be capable of behaving both as Initiator and Responder.

Usually, the Initiator will have a form of graphical user interface application 240 so that a user can see/browse thumbnails, select and chose an appropriate control action, and so on. The Initiator device implements the device enumeration and transport mapping (in the case that multiple, PTP-compliant transports are supported) in a transport specific manner. Typically, a Responder will not have a graphical user interface or multiple transport support.

In order for two PTP devices to exchange information about pictures or metadata, a PTP session may be established. A session is a logical connection between PTP devices, over which object identifiers, or ObjectHandles, and storage media identifiers, or StorageIDs, are persistent. A session is considered open after the Responder returns a valid response to an OpenSession operation requested by the Initiator. A session is closed after a CloseSession operation is completed or the transport closes the communication channel, whichever occurs first.

The only operation or data traffic allowed outside the session is a GetDeviceInfo operation and a DeviceInfo dataset. A device can issue/accept a GetDeviceInfo operation outside a session. A session may be utilized to transfer descriptors (e.g., StorageInfo, ObjectInfo), images or other objects between devices. Any data communicated between devices is considered valid unless a specific event occurs specifying otherwise.

PTP is actually a transport independent protocol. In its original embodiment it was designed and intended for use over a Universal Serial Bus (USB) transport—"legacy PTP". Alternative transports can be implemented over local area networks. Examples include PTP over Bluetooth and PTP over IP networks 210 (PTP/IP) as illustrated in FIG. 1.

As described in the CIPA-DC-005-2005 PTP-IP Standard which can be found at http://www.cipa.jp, hereby incorporated by reference, a PTP/IP device is uniquely recognized using a unique device identifier called GUID. Two PTP/IP devices can communicate with each other if their GUIDs are known to each other. In this way, application software running on such devices can implement restriction connection policies. Both the Initiator and Responder can maintain a list of GUIDs for devices to which they may connect.

There are multiple ways that the GUIDs of peer devices can be exchanged, e.g., storage media based methods or networking based methods.

Referring to FIG. 1, In PTP/IP, communication between two image devices happens via two TCP connections (logical data channels) 211,212. The first connection 211 is dedicated to Operation Request, Response and Data transaction packets as well as to carry PTP/IP specific packets (i.e. Command/Data Connection). The second TCP connection 212 should be used exclusively for Event transaction packets (i.e., Event Connection). Event packets are transported separately from Operation and Data transaction packets because of their asynchronous nature.

Each of the Command/Data TCP and the Event connection are established by the image Initiator device and identified by the local and remote IP addresses and port numbers. The Responder's IP address and port number are provided through the device discovery mechanism or manually configured using a user interface on the Initiator device.

Further details are given in (i) "Digital camera connectivity solutions using the picture transfer protocol (PTP)" to Bigioi, P.; Susanu, G.; Corcoran, P.; Mocanu, I and published in IEEE Transactions on Consumer Electronics, volume 48, issue 3, p 417-427, August 2002; and (ii) PTP ("Picture Transfer Protocol" which is an international standard ISO-15740 PTP Specification (see http://www.i3a.org/downloads_it10.html), which are hereby incorporated by reference.

Note that reference (i) above also includes a detailed description of a PTP/Bluetooth transport.

The PictBridge Standard (CIPA DC-001) from the Camera & Imaging Products Association (CIPA), and published in early 2003, provides for direct connection between image input devices, such as digital cameras, and image output devices, such as printers. It achieves this by standardizing the applications services for these devices. In particular it focuses on the provision of direct print services from a camera to a printer, without the need for a USB master device such as a desktop PC.

CIPA DC-001 takes advantage of the commonality of digital camera interfaces and data storage formats to provide an effective solution for connectivity between a single camera and a single printer. Key services offered by DC-001 compliant devices include: (i) direct printing one or more selected images on the camera UI; (ii) support for "Direct Print Ordering Format" (DPOF) based print services; (iii) index print of all images in camera; (iv) display of printer status information on the camera UI; (v) print job control functions—cancel, pause, restart and (vi) additional features which require advanced print setup, such as multiple print copies, image crop prior to print, specify image print size, etc.

CIPA DC-001 uses PTP to provide low-level functions and services which are used to support the higher-level functionality of PictBridge.

Most digital photography devices on the market today support legacy PTP in order to allow interconnection of media devices such as cameras and printers without the need for an intermediate desktop PC. Printers which are designed for digital photography will also support PictBridge which allows a PTP camera to directly select and print images. The physical link for such PTP enabled devices is usually a wired connection between the PTP/Pictbridge devices and this is typically a USB connection.

Wireless printers are already available in the market and next-generation cameras and printers will support connection over wireless networks using PTP/IP. This will provide users with a greatly enhanced experience creating photographic prints without physically connecting a camera to a printer.

Unfortunately the owners of legacy PTP devices will be unable to benefit because legacy cameras and printers do not (i) provide a physical network connection, (ii) their legacy PTP software does not support or understand TCP/IP networking and/or (iii) no support is provided in the PTP protocol for device discovery, nor for supporting the presence of multiple devices as would typically exist on a TCP/IP network.

SUMMARY OF THE INVENTION

A method is provided for establishing a paired connection across a network between first and second media devices including a digital camera device. Responsive to user interaction with the first media device, a first information message including an identifier is transmitted across the network with a request to pair the first media device with the second media device. An identifier of the second device is retrieved from the second information message in response to receipt of the second information message from the second device within a first predetermined time period. A confirmation message including an identifier of the first device and an identifier of the second device is transmitted across the network. In response to receipt of a corresponding confirmation message from the second device within a second predetermined time period, a paired connection is completed. The method also includes initiating image transfer from the digital camera device to a remote storage device that cooperates with the camera device via a camera adapter, and preferably a PTP camera adapter.

One or more of the information and confirmation messages may be transmitted via User Datagram Protocol.

The first media device may be responsive to receipt of an information message from a third media device, different from said second media device, upon failing to establish a paired connection with the second device during the first or second predetermined time periods.

Further paired connections may be established with further media devices.

The information and confirmation messages may include a protocol identifier.

The communicating may be according to the Picture Transfer Protocol (PTP).

The connection between the first and second media devices preferably employs a communications protocol which permits the first device to control the second device in providing a media acquisition, filtering and/or output service.

A media device is also provided for handling media and establishing a paired connection with a second media device across a network. The media device includes a media device housing containing a media handling component architecture, a network interface coupled with the component architecture, and a pairing actuator. The media device comprises a digital camera device and is configured to cooperate with a remote storage device via a camera adapter, preferably a PTP camera adapter, to initiate image transfer from the camera device to the storage device.

The pairing actuator is signal-coupled with the network interface such that, upon user interaction with the pairing actuator, transmission of an information message is initiated through the network interface. The information message includes an identifier and a request to pair the media device with a second media device.

Responsive to receipt of an information message through the network interface from the second media device within a first predetermined time period, the first media device retrieves an identifier of the second device from the information message and transmits a confirmation message through the network interface including identifiers of the first and second devices. Responsive to receipt of a corresponding confirmation message through the network interface from the second media device within a second predetermined time period, a paired connection is completed. The connection preferably employs a communications protocol which permits the first device to control the second device in providing a media acquisition, filtering and/or output service.

A digital image acquisition and storage system is also provided including a digital camera device, a camera adapter, preferably a PTP camera adapter, and a remote storage device. The remote storage device cooperates with the camera device via the camera adapter to initiate image transfer from the camera to the storage device.

A system of devices is further provided including a digital camera adapter device and a storage device, wherein said adapter device is arranged to connect to a camera via a bus interface. The adapter device is arranged to connect to the storage device via the network interface. The storage device is preferably arranged to send a request periodically via the adapter device to the camera to determine whether a backup of data stored on the camera may be performed and to monitor for a response.

The adapter device may be responsive to receipt of a response to send a request for data to the camera and to receive and store the data for later retrieval by the storage device. The request may include a request for data to be transferred.

The adapter device may be arranged to query the storage device to determine whether a memory of the storage device is full.

The storage device may be arranged to mark data not to be deleted from the storage device. The storage device may be arranged to provide the camera with information about data stored in said storage device.

A backup system is also provided including an adapter device and a storage device. The adapter device is arranged to connect to a camera via a bus interface and arranged to connect to the storage device via a network interface, thereby enabling messages to be transmitted between the storage device and a camera. The storage device may be arranged to initiate data transfer from the camera to the storage device via the adapter device.

A digital camera adapter device is also provided for establishing a paired connection with a second device across a network. The adapter device includes a user actuator, a network interface and a bus interface. The adapter device is arranged on establishment of the paired connection to transmit messages between the bus interface and the network interface. The adapter device is responsive to user interaction with the user actuator, to transmit an information message through the network interface, wherein the information message includes an identifier indicating that the user of the device wishes to pair the device with the second device. Responsive to receipt of an information message through the network interface from the second device within a first predetermined time period, the adapter device retrieves an identifier of the second device from the information message and transmits a confirmation message through the network interface including an identifier of the device and an identifier of the second device. Responsive to receipt of a corresponding confirmation message through the network interface from the second device within a second predetermined time period, the adapter device completes a paired connection with the second device.

A system including the adapter device and a storage device is further provided. The adapter device is arranged to connect to a camera via the bus interface, and the adapter device is arranged to connect to the storage device via the network interface. The storage device is preferably arranged to send a request periodically via the adapter device to the camera to determine whether a backup of data stored on the camera may be performed and to monitor for a response.

BRIEF DESCRIPTION OF THE DRAWINGS

Preferred and alternative embodiments will now be described by way of example, with reference to the accompanying drawings, in which:

FIG. 4 illustrates a general format of a packet used in the pairing sequence of FIG. 2;

FIG. 5 illustrates a DEVICE INFO Message format;

FIG. 6 illustrates a CONFIRMATION Message format;

DETAILED DESCRIPTION OF PREFERRED EMBODIMENTS

In preferred embodiments, a manual means of GUID exchange in order to allow further PTP/IP communication, also known as "device pairing", is provided. This exchange mechanism is particularly suited to usage scenarios for digital cameras and associated network printers. However, as may be understood by those skilled in the art, alternative forms of exchange mechanisms may be used to support alternative embodiments.

Two particular device embodiments permit (i) a legacy PTP camera to be connected to a PTP/IP enabled PictBridge printer and (ii) a legacy PictBridge printer to allow connections to be created with PTP/IP enabled digital cameras.

As such, a device in accordance with a preferred embodiment provides TCP/IP network compatibility for legacy media devices such as PTP cameras and PictBridge printers. Advantageously, PictBridge functionality may be extended to a TCP/IP network by replacing the PTP/USB transport with PTP/IP, even when devices do not support a common physical TCP/IP network link.

Figure 1:
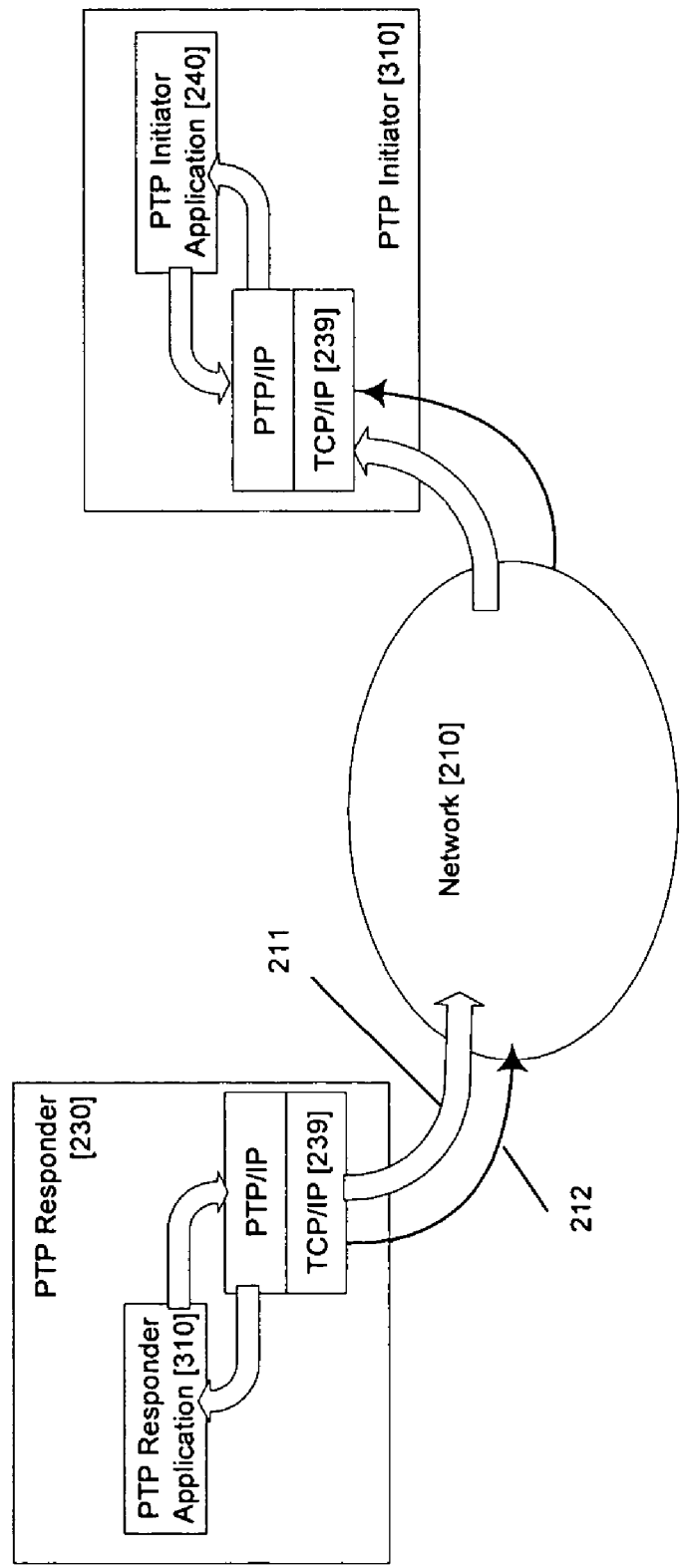
FIG. 1 illustrates operation of a conventional PTP/IP communication.
Figure 2:
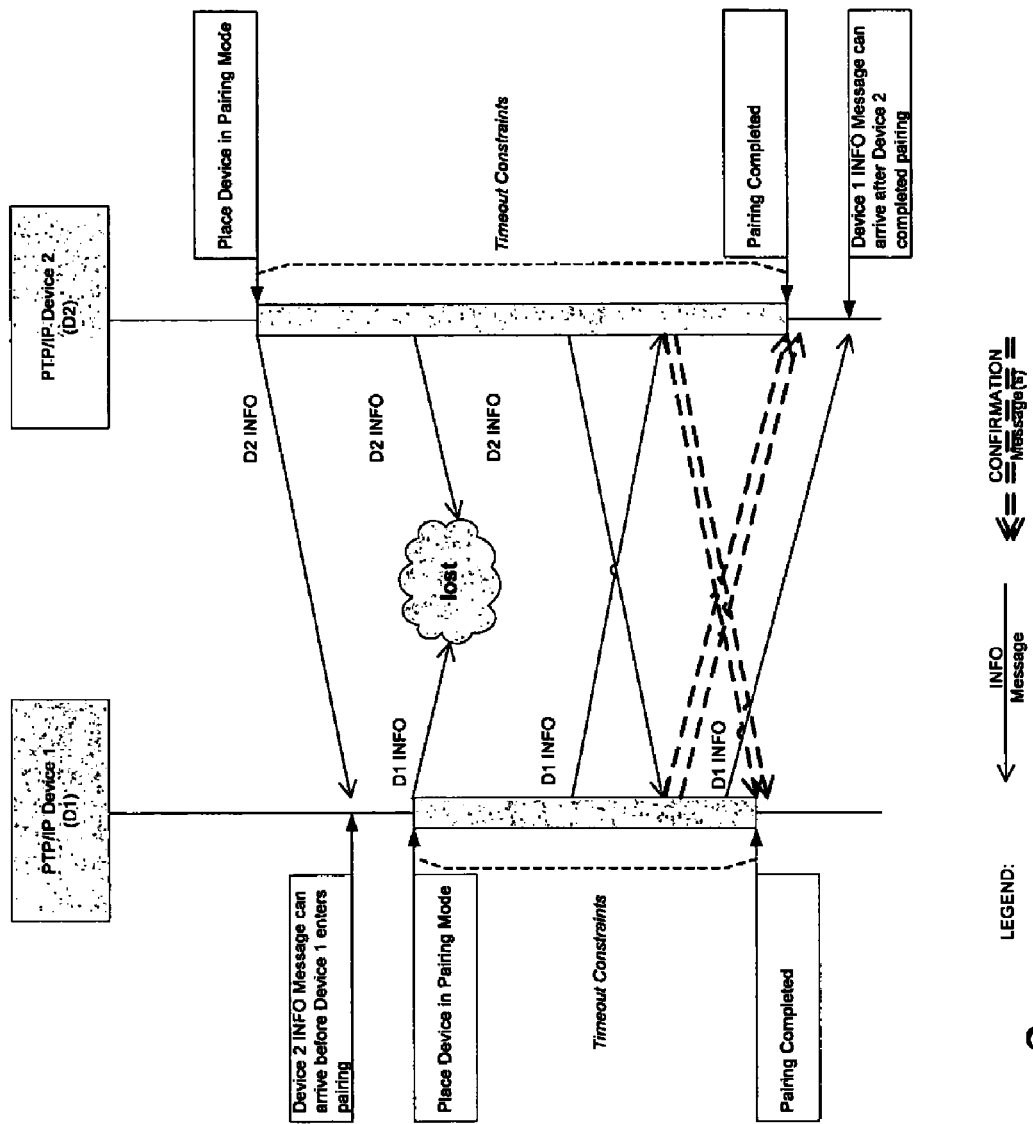
FIG. 2 illustrates a sequence of pairing two media devices according to a preferred embodiment.

Referring now to FIG. 2, devices D1 and D2 are preferably paired before PTP/IP communication across a network takes place. In accordance with a preferred embodiment, a protocol based on an exchange of messages contains pairing information (GUID and Friendly Name) between two devices placed in a pairing mode (or pairing state). In general, messages employed by the protocol are preferably as shown in FIG. 4. Each packet part of this protocol starts with a 16 byte field representing a GUID of the protocol—a value specially generated for this protocol. The GUID used by the PTP/IP pairing mechanism of the preferred embodiment is 0FDB8EFB-6968-4734-A0CF-48694382A3D7. This GUID is basically a protocol identifier for ensuring that the received UDP packets will not be wrongfully interpreted.

The protocol GUID field is followed by a type field having one of the following values (two byte field):

0x01—DEVICE INFO
0x02—CONFIRMATION

This in turn is followed by a payload which comprises a variable size content, differing according to the type of the packet.

Binary values in the packets are represented in the little endian format.

Preferably, a user causes a device to enter pairing mode by interaction with a suitable actuator. In a general purpose computing device running an application which communicates using PTP/IP, such actuation can include pressing a keyboard key or actuating a pointer switch. On less complex or more dedicated devices described later, however, actuation can be through a simple button. For simplicity, however, we will refer to these generally as the pairing actuator.

Preferably, the protocol is such that the chances that the pairing will be done successfully are larger if the pairing actuator on both devices which are to be connected is pressed at or about the same time.

In the preferred embodiment, when placed in pairing mode, the PTP/IP device sends out a series of DEVICE INFO messages and starts listening on UDP port 15740 for any Device INFO messages from remote devices.

When in pairing mode, the device sends one DEVICE INFO Message per second and the expiry time of pairing mode is set to 5 seconds.

FIG. 5 presents a preferred layout for a DEVICE INFO Packet:

Device GUID—is a device identifier (GUID)
Device Friendly Name—null-terminated UNICODE string that contains a human readable name for the remote device. The information in this field is generally used for application user interface purposes.
Reserved Data—0 or more bytes reserved for the expansion of the protocol. The maximum value is limited by the MTU (Maximum Transmission Unit) of the used underlying network. This can be used for manufacturer specific data of the sending device.

The DEVICE INFO message is sent multiple times, with a time interval between them, to compensate for the fact that the two devices involved in the pairing procedure need not be put in pairing mode at exactly the same moment in time. Preferably, DEVICE INFO messages are sent at the above interval until a CONFIRMATION message is received or until the expiry time.

Once a peer device receives a DEVICE INFO message, it will cache it and send out CONFIRMATION messages. Each CONFIRMATION message contains the information about both the originating and confirming device (GUIDs). To maximize the chances that the CONFIRMATION message will not be lost, it is preferred that a device send out three such messages at a time interval of 100 ms. Again CONFIRMATION messages are preferably uni-cast on port 15740 UDP. More specifically, they may have the format presented in FIG. 6, where:

Own Device GUID—is a device identifier (GUID)
Received Device GUID—is a device identifier (GUID) received via a DEVICE INFO message from the peer device.

Preferably, if a device involved in pairing receives DEVICE INFO messages from multiple devices when in pairing mode, it may fail the pairing procedure. Thus, the device preferably receives DEVICE INFO messages from only one peer device when in pairing mode to complete a successful pairing procedure. This is a practical limitation and it is based on an assumption that a user would usually wish to pair only two devices. Thus, receipt of more than one DEVICE INFO message would be indicative of an erroneous, insecure or undesirable operating environment. Likewise, a device should receive a CONFIRMATION message from no more than one peer device when in pairing mode for the same reason.

Figure 3:
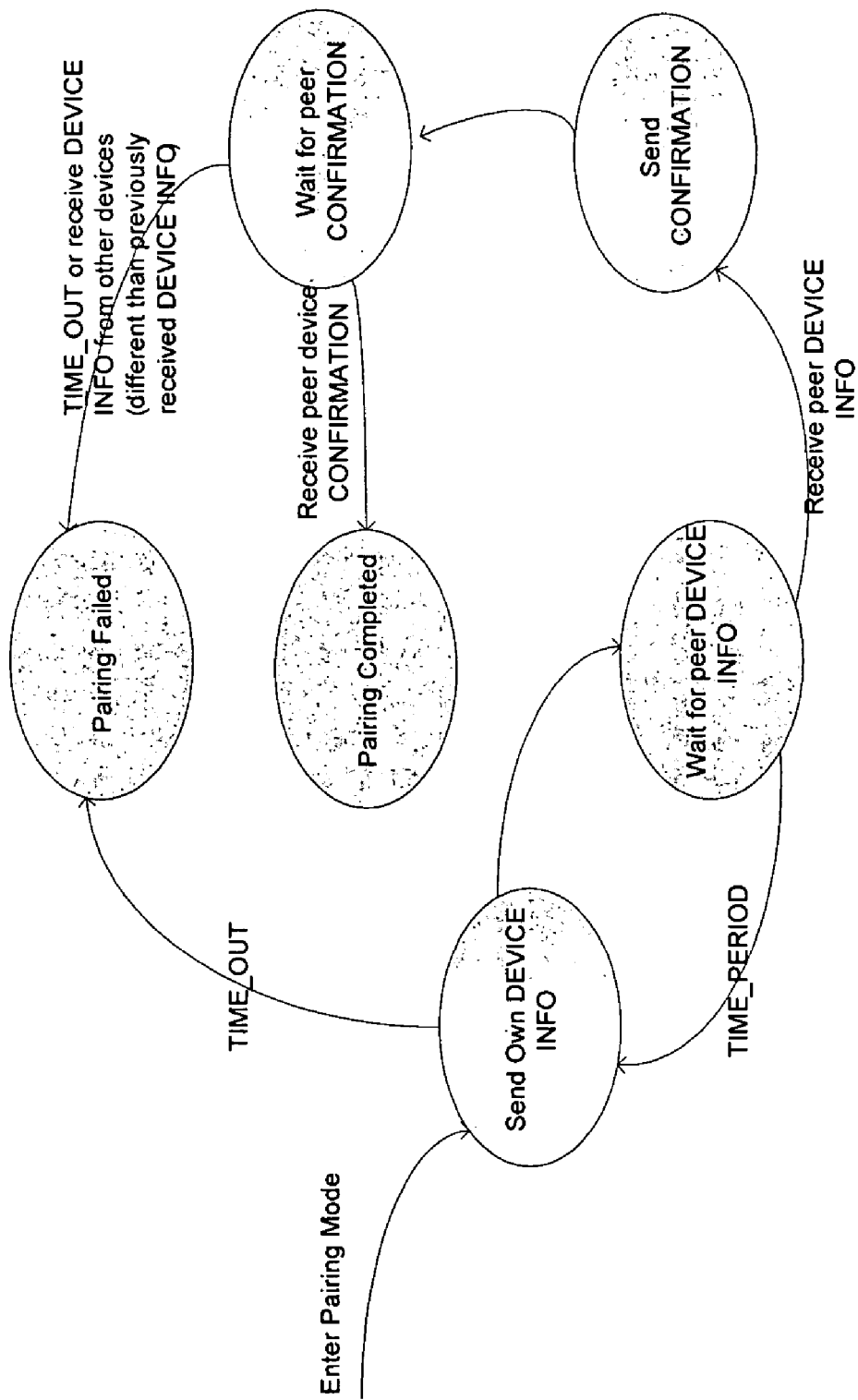
FIG. 3 illustrates a state diagram for the pairing sequence of FIG. 2.

The states that a PTP/IP device has to traverse in order to achieve a successful pairing are presented in FIG. 3.

As explained above, a device on entering pairing mode sends its own DEVICE INFO message and then waits for DEVICE INFO messages from peer pairing devices. Upon a defined time period (TIME_PERIOD), the device resends its own DEVICE INFO information. If upon a defined time out (TIME_OUT) period no peer DEVICE INFO is received, the device gives up and declares the pairing procedure failed.

If the device receives DEVICE INFO message from a peer device, then it sends its own CONFIRMATION message and waits for a peer CONFIRMATION message. Upon receipt of the peer device CONFIRMATION message matching the previous information received via peer DEVICE INFO message, the pairing session is completed successfully. If a CONFIRMATION message is not received upon the defined timeout (TIME_OUT) the pairing procedure is declared failed. If other DEVICE INFO messages are received from other devices than the one received initially, then the pairing procedure is declared failed. If other CONFIRMATION messages from other devices than the one received initially are received, then the pairing procedure is declared failed.

Nonetheless, it will be seen that once pairing has been completed between, e.g., a local device and a remote device, then in certain cases it can be possible to have the local device pair with one or more subsequent devices and to maintain connections to multiple remote devices in separate virtual sessions.

The features described herein in accordance with preferred and alternative embodiments find utility in many different types of devices where application software communicating through PTP/IP runs. These include, for example, general purpose computing devices, printers and digital image acquisition devices, e.g., digital cameras. These features can also be implemented in more dedicated devices such as hardware translators or indeed in software translators.

As explained above, there are two PTP transports already used in devices:
1) USB—which was the first adopted PTP transport and is currently widely supported in Digital Still Cameras and recently in PictBridge printers; and
2) PTP/IP—which is a relatively new transport and which will become available soon in some WiFi cameras.

Having adopted those transports, users will encounter the situation when it is desirable to have a "legacy" USB-PTP device communicate with a PTP/IP device.

In a particular embodiment, a translator may be used when it is either not possible or inconvenient to directly connect an Initiator to a Responder, e.g., because they are using different transports, i.e., hardware interfaces. An example would be where a USB Camera (PTP Responder) is to be connected to a PC (PTP Initiator) via WiFi.

In the context of the present specification, a PTP Translator is a device or a software module that indirectly connects a PTP Initiator with a PTP Responder, where Initiator and Responder usually (but not necessarily) use a different type of transport (e.g. USB, TCP/IP, etc.). The function of the translator is to repeat the PTP communication from one transport to another, as it would be if the Initiator and Responder were connected directly. A feature of such translators is that they don't fully implement PTP or application level protocols (i.e. PictBridge).

In general, there are at least two ways for such PTP translator to translate PTP communication traffic:

Acting as a gateway to perform translation, interpret PTP commands and also generate simple PTP protocol elements (i.e. implement OpenSession, CloseSession, etc.) to deal with multiple sessions on one side and single session on the other side (i.e. PTP Gateway). That means that the device should know the semantics of PTP commands, and in particular PTP commands used by the PictBridge protocol and being relayed by the translator. A disadvantage can be that it is difficult to implement a generic gateway, because a device may use vendor commands for which the semantics are not known. In general, a gateway can be vendor specific or alternatively allow just standard PTP commands (for which the semantics are defined).

Acting as a bridge to pass-through a PTP command from one end to another using a common translation procedure that converts the packets of one transport protocol to another transport protocol. An advantage is that a generic bridge can be opaque for a PTP device that maintains vendor features.

Some useful cases of translators, which will be described in more detail later, are as follows:

PTP Camera Adapter—Internal or external PTP/USB to PTP/IP device that network enables an existing USB digital camera. In particular, when implemented externally, the adapter can take the form of a dongle. The camera only runs PTP protocol over USB, while the PTP adapter acting as either a bridge or a gateway runs the communication protocols that make the camera a PTP network camera. One end of the adapter acts as a USB-Initiator and is connected to the camera, and another end is a PTP/IP-Responder and is connected to a PTP/IP Initiator.

PTP Printer Adapter—Internal or external PTP/IP to PTP/USB device that network enables an existing USB Pict- Bridge™ Printer. Again, when implemented externally, the adapter can take the form of a dongle. The printer runs PictBridge™ over USB, while the PTP adapter, running as a gateway, has the communication protocols to make the printer look like a network PictBridge™ printer. In this case, one end of the adapter is a USB-Responder and is connected to the printer, and another end is a PTP/IP-Initiator and is connected for example across a WLAN to a WiFi camera. Such a translator allows a currently available standard PictBridge printer to talk with PTP/IP cameras that will soon appear on the market.

PTP PC Adapter—PTP/IP to PTP/USB Device that network enables an existing PC that works with standard USB PTP cameras. The PC runs a standard PTP/USB Initiator (i.e. Windows XP WIA or MAC OSX ICA), while the adapter acts as a standard PTP Responder every-time it detects a peer PTP/IP Responder, making it look to the PC as it would be directly attached via a USB cable.

PTP Camera Adapter

Figure 7A:
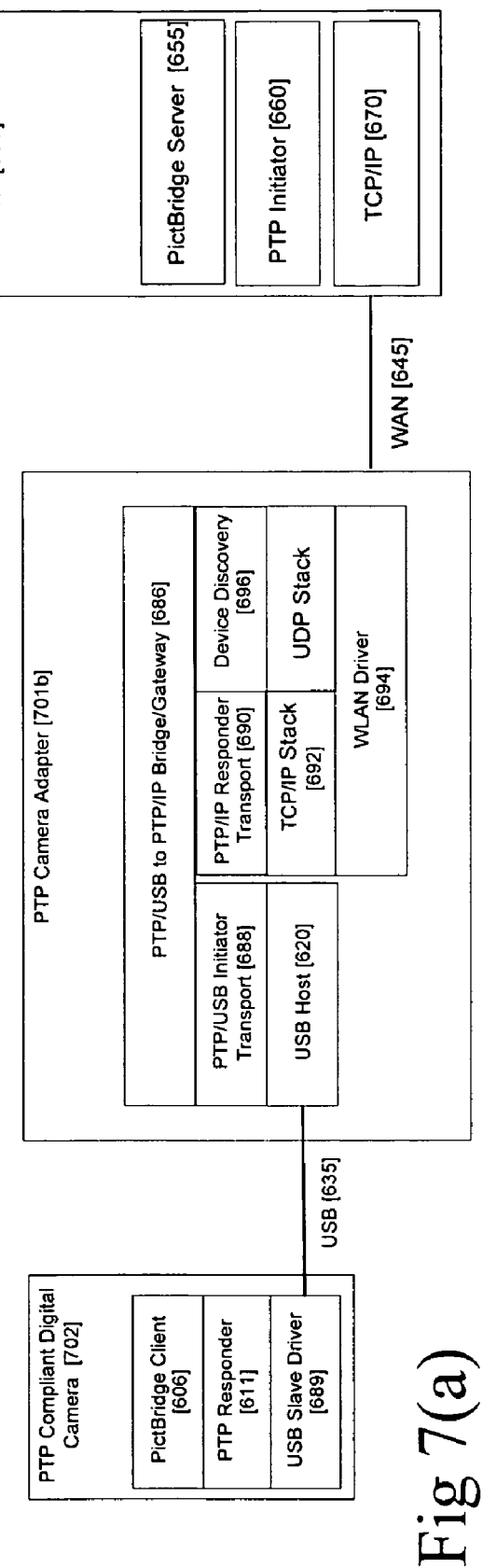
FIGS. 7(a) to 7(c) illustrate PTP adapters coupled between various combinations of media devices.

Referring now to FIG. 7(a), a convention PTP compliant digital camera 702 is connected via a USB connection 635 to a PTP Camera Adapter 701b according to a preferred embodiment. In this case, the camera PTP responder 690 communicates across a wireless LAN via a driver 694, although it will be seen that it can be arranged to communicate across any network—wired or wireless—using any required transport.

It should be noted that in a conventional PTP compliant camera, the PTP Responder 611 will in general not allow multiple PTP sessions—because a USB slave 689 was only connectable with one USB host 620 at a time.

However if the features of the PTP Camera Adapter are extended, then the adapter 701b can be used in at least two different scenarios:

to allow the camera to implement PictBridge™ client; and/or to allow the camera to implement a PTP generic responder.

Where the camera implements a PictBridge™ client 606, then an adapter with a single PTP session is enough and a PTP Bridge 686 implementation within the adapter will suffice. The protocol for selecting the PTP device with which the camera communicates during this session is as described in relation to FIGS. 2 to 6 and is implemented within a device discovery layer 696 which is responsive to a user actuating a pairing actuator (not shown) on the adapter 702b and the printer 650 within the required time out period and without interference from other pairing devices.

Where the camera implements a PTP generic Responder, then it is natural for this Responder to work with multiple Initiators in the network. In order for the PTP Camera Adapter to support multiple PTP sessions, the adapter supports a feature called "Virtual Sessions". With Virtual Sessions the adapter serializes PTP traffic from multiple remote devices including PTP Initiators 660 to one USB slave 689. Each remote initiator is paired in sequence with the adapter as described with reference to FIGS. 3 to 6, so limiting the connections to the camera 702.

In relation to virtual sessions, a unit of serialization normally is a PTP Transaction. In most cases, the standard PTP commands are stateless—so allowing one PTP Transaction at a time will do for simple scenarios. However, in general there are standard and as well as vendor commands that work in a specific sequence and are not stateless. In that case the adapter would utilizes further semantics of such commands and a more complex serialization of transactions, e.g., so that one Initiator 660 will not break an atomic command sequence of another Initiator. Additionally, some commands involve more actions than just passing-through: e.g. a DeleteObject command involves sending ObjectRemoved event for each Virtual Session than the current one. For this reason, a PTP Gateway 686 implementation is more appropriate for implementing Virtual Sessions and for ensuring an ordered processing of transactions between sessions for devices paired through the adapter.

In one implementation of the adapter, both Bridge and Gateway are implemented. Most of the time, the adapter works in Bridge mode (while only one session is active). If multiple Initiators want to work with the camera, then the adapter switches into PTP Gateway mode, allowing virtual multiple sessions.

PTP Printer Adapter (Dongle)

Figure 7B:
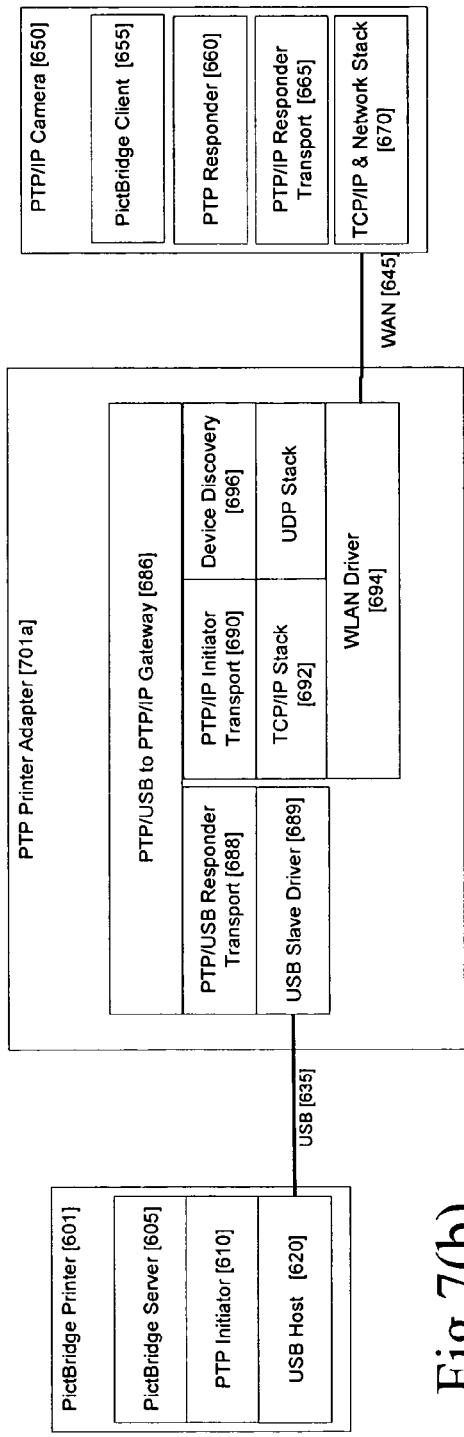

Referring now to the example illustrated at FIG. 7(b), the printer adapter 701a of this embodiment has two interfaces: a WIFI interface 694 and USB Slave interface 689. Its primary function is to transform a standard USB PictBridge™ printer 601 into a WIFI PictBridge™ printer, available on a wireless local area network 645. Such an adapter preferably connects only to PictBridge™ clients (PTP/IP Responders that advertise their application protocol to be PictBridge™, or their intent to print).

It will be seen that the adapter 701a can in practice only be implemented with a gateway layer 686 rather than with more basic bridge functionality. One reason is that the legacy printer side USB transport (unlike PTP/IP) does not carry enough self-descriptive information about the command being transported, so it does not allow the PTP Printer Adapter (or a PTP PC Adapter) to be implemented as a PTP Bridge. Another reason is that a PTP Bridge does not allow a virtual session approach to be implemented safely in all cases.

Figure 8:
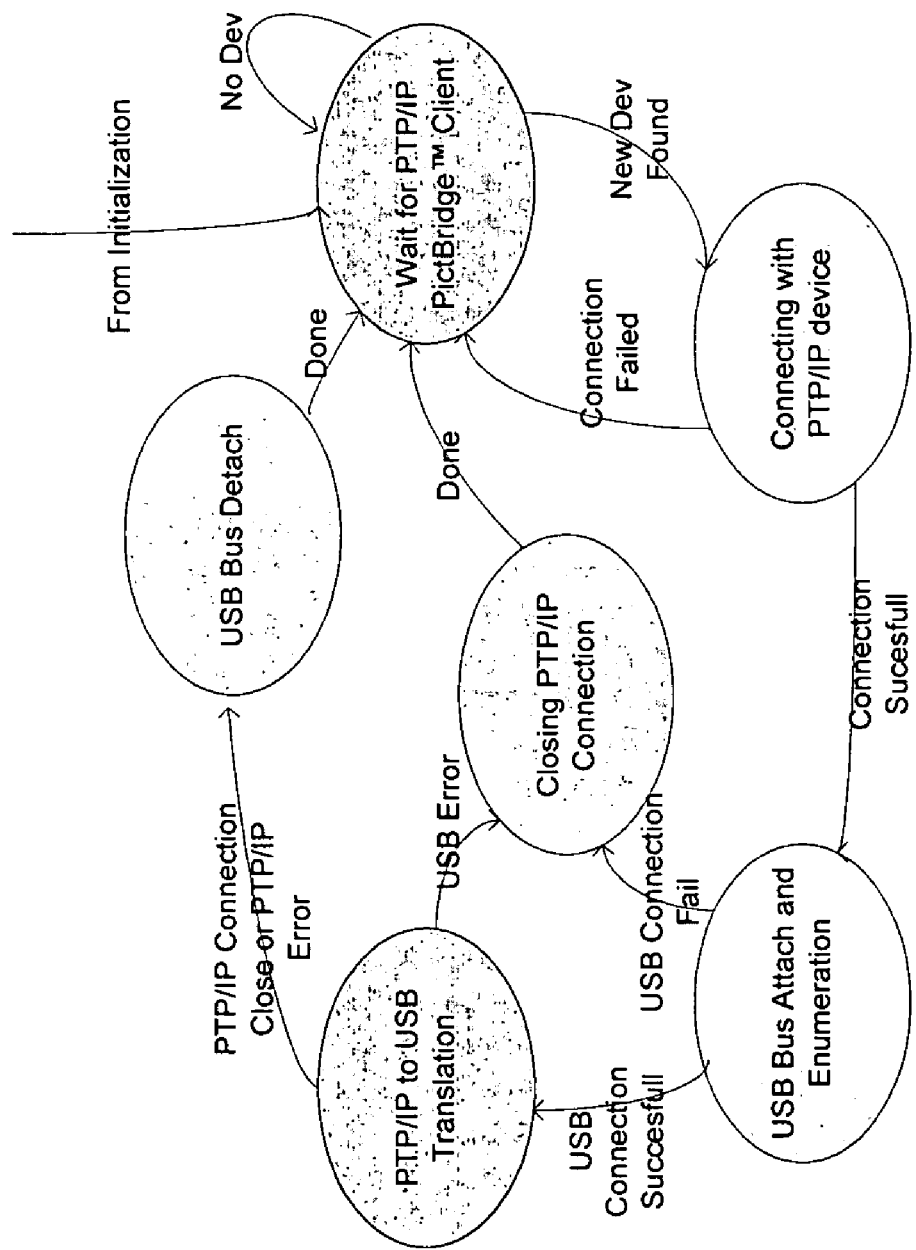
FIG. 8 is a PTP Printer Adapter Normal Function Sequence Diagram.

It will be seen that the PTP Printer Adapter transforms a bus based protocol (USB) into a networking protocol (IP). As shown in FIG. 8, this PTP protocol translation from one transport (PTP/USB) to another transport (PTP/IP) is performed only when a PTP/IP device is detected and a successful PTP/IP connection is established, e.g., as described in relation to FIGS. 3-6 and again performed by the device discovery layer 696. Then, if this is the first session to be established, the USB slave 689 of FIG. 7(b) attaches to the printer's USB bus 620, causing the enumeration and USB connection. The Initiator (printer) starts the communication with the remote PTP device, for example, a PTP/IP camera 650 as it would if the remote device were connected locally.

The USB attach and detach is performed by programmatically connecting/disconnecting a 1.5M pull up resistor (see USB BUS SPECIFICATIONS) used by USB standard for detection of a USB 12 Mbps device connected to the bus.

Since only one remote device 650 connected to the PTP printer adapter 701a prints to the actual printer at a time, the printer adapter deals with multiple paired PTP/IP devices in sequence beginning with the first paired device for which print intent has been detected. Once the printing is done with this device, the dongle looks for more paired PTP/IP devices (with print intent). If more devices are detected, the printer chooses one and initiates the connection to them.

Due to the PTP/USB transport specification limitations (i.e not knowing the next phase of a PTP command), the translation that takes place between PTP/USB and PTP/IP can't be done just at the transport level. The device will need to be a PTP Gateway, in the sense that it will interpret the PTP payload to figure out what command is in progress. In this way, the translator will be able to associate a command with a known data-phase (by maintaining a lookup table with the associations). This device is not generally designed to work with vendor specific commands, and so, for each vendor command to be supported, the translation table would be updated with vendor specific information.

PTP PC Adapter

Figure 7C:
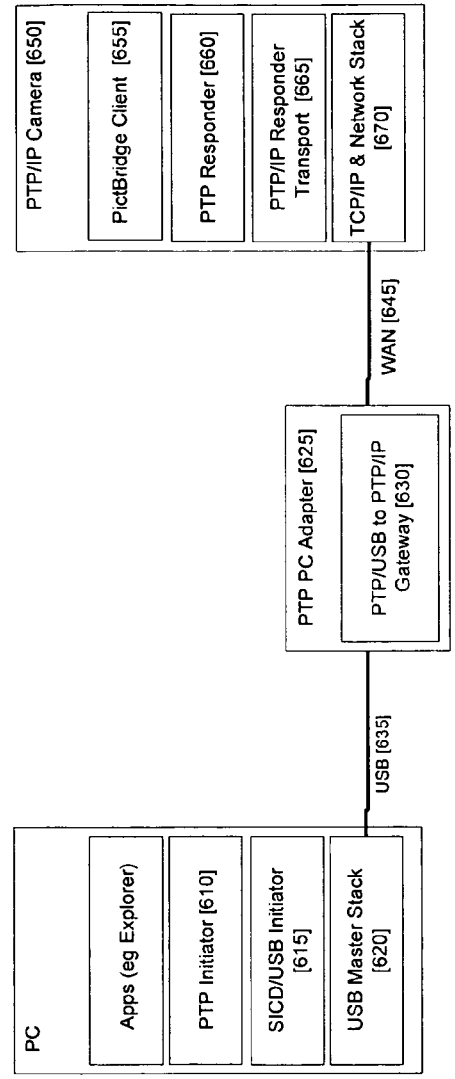

Referring to FIG. 7(c), PC adapter 625 works in a very similar manner as the PTP Printer Adapter of FIG. 7(b). A difference is that it can establish a connection with a PTP generic responder application instead of a PictBridge PTP responder. This device, due to USB limitations, will be either connected with only one PTP/IP Responder, for example, within a PTP/IP camera 650, either at any time or it would establish virtual sessions for each PTP/IP Responder.

Figure 9:
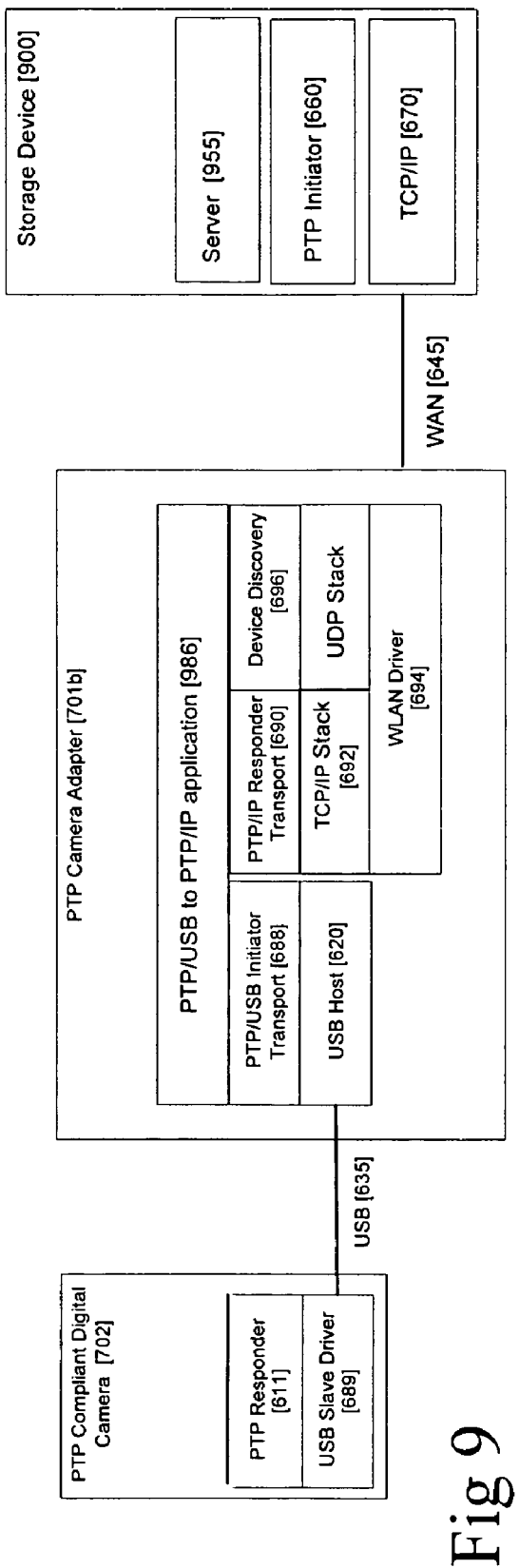
FIG. 9 illustrates a digital camera device that cooperates with a remote storage device via a camera adapter to initiate image transfer from the camera device to the storage device.

Referring now to FIG. 9, there is illustrated a variant example of the camera adapter of FIG. 7(a) which preferably runs under the control of a PTP/USB to PTP/IP application 986. This embodiment incorporates a PTP compliant digital camera 702 connected via a USB connection 635 to the PTP Camera Adapter 701b, as described above in relation to FIG. 7(a). In this case, however, the application 986 controls the camera PTP responder 690 to communicate across the wireless LAN 645 via the driver 694 to a server application 955 running in a remote storage device 900.

The server application 955 initiates contact with the camera 702 via the application 986 to determine whether the camera is free to perform backup storage.

In one such embodiment, the storage device sends a request via the PTP Camera Adapter 701b to the camera periodically to determine whether the camera is free to perform backup storage. If application 986 determines that the camera is free to perform backup, a message is sent to the storage device. The storage device then requests the data to be stored. This request is sent via the PTP Camera Adapter 701b to the camera. The camera then sends the requested data via the PTP Camera Adapter 701b to the storage device 900, where it is stored in backup memory (not shown).

In an alternative embodiment, the storage device sends a single request to the PTP Camera Adapter 701b. The PTP Camera Adapter then sends requests to the camera periodically to determine whether the camera is free to perform backup storage. If it is determined that the camera is free to perform backup, the PTP Camera Adapter 701b requests the data to be stored from the camera. Alternatively the PTP Camera Adapter 701b informs the storage device 900 that the camera is free to perform backup, and the storage device requests the PTP Camera Adapter 701b to retrieve the data to be stored. The camera then sends the requested data to the PTP Camera Adapter 701b where it is either stored in cache for later retrieval by the storage device 900, or it is sent directly to the storage device 900 where it is stored.

However, it will be appreciated in these embodiments, that the request to determine whether the camera is free to perform backup storage may also include a request for the data to be stored. In such case, once the camera is free to perform backup storage, the data is sent either to the PTP Camera Adapter 701b or via the PTP Camera Adapter 701b to the storage device 900, without the need for an independent data request.

Figure 10:
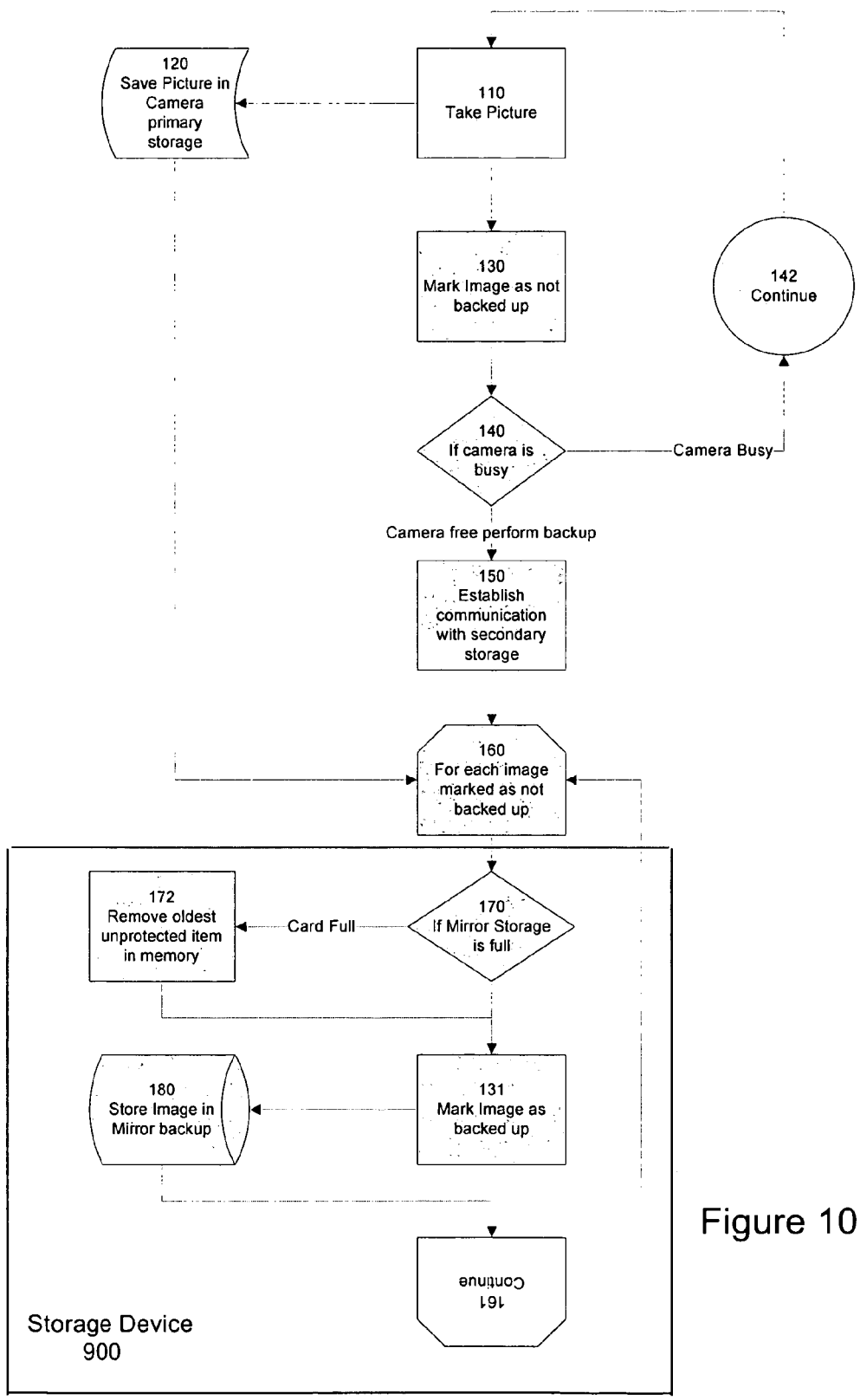
FIG. 10 is a flowchart depicting a process involving a digital camera device operating with the adapter and remote storage device of FIG. 9.

Referring now to FIG. 10, there is illustrated a flow chart depicting an exemplary operation of the camera 702 in communication with the storage device 900 via the PTP Camera Adapter 701b, preferably according to the embodiment of FIG. 9.

A picture is taken 110 with the camera, and the image is stored 120 in a primary storage facility of the camera 702. The image is then marked as not backed up, 130. The camera receives requests periodically from the storage device via the PTP Camera Adapter 701b or from the PTP Camera Adapter 701b. If the camera is busy, it will continue to take pictures 142. If the camera is free, it establishes communication 150 with either the storage device 900 via the PTP Camera Adapter 701b or the PTP Camera Adapter 701b.

The storage device or cache is queried as to the available memory 140. Preferably, the storage device or cache operates as FIFO in that if the memory is full, the oldest image in the memory stack is removed 172. An image stored 120 in a primary storage facility of the camera 702b marked as not backed up, is marked as backed up 131 and stored in the backup memory. The storage device or cache is again queried as to the available memory 140 and the next image marked as not backed up, is marked as backed up and stored in the memory. The procedure continues until all images have been backed up or the camera is no longer free to perform backup.

It will be appreciated that the storage device 900 or camera may allow a user to mark images not to be deleted from backup memory. In this case, some images will be protected and will not be removed. Thus if the memory is full of images that are marked not for deletion, the camera may be notified that the storage device is full.

It will also be appreciated that the camera application software can be arranged to communicate with the adapter application 986 to receive information about the storage device 900, such as the last image backed up, or the first image backed up on the device, and may then be viewed on a display of the camera.

Furthermore, it will be appreciated that the storage device 900 may keep track of the images and the changes thereto as stored in the primary storage of the camera. For example, if all the images on the primary storage have been deleted, the storage device may automatically prompt the user to ask if the corresponding backup memory images should be deleted as well.

In one embodiment, the protocol for selecting the storage device 900 with which the camera adapter 701b communicates during a backup session is as described in relation to FIGS. 2 to 6 and is implemented within a device discovery layer 696 which is responsive to a user actuating a pairing actuator (not shown) on the adapter 702b and the storage device 900 within the required time out period and without interference from other pairing devices.

However, it will be appreciated that the adapter and the storage device may be arranged to identify and communicate with each other by other means.

It will also be appreciated that the storage device can be implemented in many different formats. For example, it could be a simple battery powered device which a photographer keeps in his pocket. The device may have a simple interface to enable operation and indicate, e.g., memory used and/or battery power. The storage device may also take the form of a remote computer and backup store either dedicated to the user or common to many users or even operated by a bureau service. Alternatively, the storage device may be implemented in a modified printer associated with the camera as shown in FIG. 7(a).

The present invention is not limited to the embodiments described above herein, which may be amended or modified without departing from the scope of the present invention as set forth in the appended claims, and structural and functional equivalents thereof.

In methods that may be performed according to preferred embodiments herein and that may have been described above and/or claimed below, the operations have been described in selected typographical sequences. However, the sequences have been selected and so ordered for typographical convenience and are not intended to imply any particular order for performing the operations.

In addition, all references cited above herein, in addition to the background and summary of the invention sections, are hereby incorporated by reference into the detailed description of the preferred embodiments as disclosing alternative embodiments and components.

The invention claimed is:

1. A digital camera adapter device for handling media and establishing a paired connection with a second media device across a network, comprising:
   a media device housing containing a media handling component architecture;
   a network interface coupled with the component architecture; and
   a pairing actuator signal-coupled with the network interface such that, upon user interaction with the pairing actuator, transmission of an information message is initiated through said network interface, said information message including an identifier indicating that the user of the adapter device wishes to pair the device with a second media device,
   wherein responsive to receipt of an information message through said network interface from the second media device within a first predetermined time period, the adapter device further for retrieving an identifier of the second device from the information message and for transmitting a confirmation message through said network interface including an identifier of the adapter device and an identifier of the second device; and
   responsive to receipt of a corresponding confirmation message through said network interface from the second media device within a second predetermined time period, the adapter device further for completing a paired connection with the second device, and
   wherein the adapter device is configured to initiate image transfer to a remote storage device from the adapter device which serves as temporary storage for a digital camera device,
   wherein the adapter device further comprises a bus interface, said adapter device being configured on establishment of said paired connection to transmit messages between said bus interface and said network interface, and
   wherein said adapter device is arranged to connect to a camera via said bus interface and said adapter device is arranged to connect to a storage device via said network interface.

2. A device according to claim 1, further comprising a microprocessor or one or more other general purpose computing device components, printer architecture, digital image acquisition device architecture, or an adapter, or combinations thereof.

3. A device according to claim 1, wherein the network interface comprises an Internet Protocol (IP) transport interface.

4. A device according to claim 1, wherein the network interface comprises a Wireless Local Area Network interface, a Bluetooth interface, or an Ethernet interface interface, or combinations thereof.

5. A device according to claim 1, further comprising an adapter that includes a bus interface for communicating with said network interface upon establishment of said paired connection.

6. A device according to claim 5, wherein said bus interface comprises a USB interface.

7. A device according to claim 5, wherein the adapter further comprises a PTP initiator module for communication with a PTP compliant device across said bus interface.

8. A device according to claim 7, further comprising a PTP responder module for communication with one or more PTP/IP compliant devices through said network interface.

9. A device according to claim 8, further for establishing one or more further paired connections with respective devices.

10. A device according to claim 9, further for establishing respective PTP sessions with each device for which a paired connection has been established through said network interface.

11. A device according to claim 10, wherein said device acts as a bridge when a paired connection has been established with only one device.

12. A device according to claim 10, wherein said device acts as a gateway when more than one paired connection has been established.

13. A device according to claim 1, the adapter device comprising a PTP camera adapter.

14. A device according to claim 1, wherein the second device comprises a printer.

15. A device according to claim 1, wherein upon receipt of said first message and actuation of a second pairing actuator associated with said second device, said second device automatically generating and transmitting said second message.

16. A device according to claim 1, wherein upon receipt of said second message and actuation of said pairing actuator, said adapter device automatically generating and transmitting said confirmation message.

17. A device according to claim 1, wherein said paired connection employs a communications protocol which permits the adapter device to control the second device in providing a media acquisition, filtering or output service, or combinations thereof.

18. A device according to claim 1, wherein the adapter device communicates with the digital camera device using a bus protocol.

19. A device according to claim 1 in which said network interface comprises an Internet Protocol (IP) transport interface.

20. A device according to claim 19 in which said network interface comprises one of a Wireless Local Area Network, a Bluetooth, or an Ethernet interface.

21. A device according to claim 1 in which said bus interface comprises a USB interface.

22. A device according to claim 1 arranged to implement a PTP initiator for communication with a PTP compliant device across said bus interface.

23. A device according to claim 22 arranged to implement a PTP responder for communication with one or more PTP/IP compliant device through said network interface.

24. A device according to claim 23 being arranged to establish one or more further paired connections with respective devices after establishment of each paired connection.

25. A device according to claim 24 being arranged to establish respective PTP sessions with each device for which a paired connection has been established through said network interface.

26. A device according to claim 25 in which said device acts as a bridge when a paired connection has been established with only one device.

27. A device according to claim 25 in which in which said device acts as a gateway when more than one paired connection has been established.

28. A system according to claim 1 wherein said storage device is arranged to send a request periodically via said adapter device to said camera to determine whether a backup of data stored on said camera may be performed and to monitor for a response.

29. A system according to claim 28 wherein said storage device is responsive to receipt of a response from said camera via said adapter device to send a request for data to the camera via said adapter device and to receive and store said data.

30. A system according to claim 1 wherein said storage device is arranged to send a single request to said adapter device and said adapter device is responsive to said request to periodically request the camera to determine whether backup of data stored on said camera may be performed and to monitor for a response.

31. A system according to claim 30 said adapter is responsive to receipt of a response to send a request for data to said camera and to receive and store said data for later retrieval by said storage device.

32. A system according to claim 30, wherein said request includes a request for data to be transferred.

33. A system according to claim 28, wherein said request includes a request for data to be transferred.

34. A system according to claim 1 wherein said adapter device is arranged to query said storage device to determine whether a memory of said storage device is full.

35. A system according to claim 1 wherein said storage device comprises a memory operable as a first-in-first-out, FIFO memory.

36. A system according to claim 1 wherein said adapter comprises a memory operable as a first-in-first-out, FIFO memory.

37. A system according to claim 1 wherein said storage device is arranged to mark data not to be deleted from said storage device.

38. A system according to claim 1 wherein said storage device is arranged to provide said camera with information about data stored in said storage device.

39. An digital camera adapter device for establishing a paired connection with a second device across a network, said adapter device including a user actuator, a network interface and a bus interface, said adapter device being arranged on establishment of said paired connection to transmit messages between said bus interface and said network interface, and said adapter device being:
responsive to user interaction with the user actuator, to transmit an information message through said network interface, said information message including an identifier indicating that the user of the device wishes to pair the device with the second device;
responsive to receipt of an information message through said network interface from the second device within a first predetermined time period, to retrieve an identifier of the second device from the information message and to transmit a confirmation message through said network interface including an identifier of the device and an identifier of the second device; and responsive to receipt of a corresponding confirmation message through said network interface from the second device within a second predetermined time period, to complete a paired connection with the second device, and
wherein said adapter device is arranged to connect to a camera via said bus interface and said adapter device is arranged to connect to a storage device via said network interface.

40. A device according to claim 39, in which said bus interface comprises a USB interface.

41. A device according to claim 39 arranged to implement a PTP initiator for communication with a PTP compliant device across said bus interface.

42. A device according to claim 41 arranged to implement a PTP responder for communication with one or more PTP/IP compliant device through said network interface.

43. A device according to claim 42 being arranged to establish one or more further paired connections with respective devices after establishment of each paired connection.

44. A device according to claim 43 being arranged to establish respective PTP sessions with each device for which a paired connection has been established through said network interface.

45. A device according to claim 44 in which said adapter device acts as a bridge when a paired connection has been established with only one device.

46. A device according to claim 44 in which in which said adapter device acts as a gateway when more than one paired connection has been established.

47. A system according to claim 39 wherein said storage device is arranged to send a request periodically via said adapter device to said camera to determine whether a backup of data stored on said camera may be performed and to monitor for a response.

48. A system according to claim 47 wherein said storage device is responsive to receipt of a response from said camera via said adapter device to send a request for data to the camera via said adapter device and to receive and store said data.

49. A system according to claim 39 wherein said storage device is arranged to send a single request to said adapter device and said adapter device is responsive to said request to periodically request the camera to determine whether backup of data stored on said camera may be performed and to monitor for a response.

50. A system according to claim 49, wherein said adapter device is responsive to receipt of a response to send a request for data to said camera and to receive and store said data for later retrieval by said storage device.

51. A system according to claim 49 wherein said request includes a request for data to be transferred.

52. A system according to claim 47 wherein said request includes a request for data to be transferred.

53. A system according to claim 39 wherein said adapter device is arranged to query said storage device to determine whether a memory of said storage device is full.

54. A system according to claim 39 wherein said storage device comprises a memory operable as a first-in-first-out, FIFO memory.

55. A system according to claim 39 wherein said adapter device comprises a memory operable as a first-in-first-out, FIFO memory.

56. A system according to claim 39 wherein said storage device is arranged to mark data not to be deleted from said storage device.

57. A system according to claim 39 wherein said storage device is arranged to provide said camera with information about data stored in said storage device.

* * * * *